United States Patent
Krings

(10) Patent No.: US 11,536,319 B2
(45) Date of Patent: Dec. 27, 2022

(54) CONSTANT-VELOCITY JOINT

(71) Applicant: NEAPCO INTELLECTUAL PROPERTY HOLDINGS, LLC, Farmington Hills, MI (US)

(72) Inventor: Dominik Krings, Heimbach-Vlatten (DE)

(73) Assignee: NEAPCO INTELLECTUAL PROPERTY HOLDINGS LLC, Farmington Hills, MI (US)

( * ) Notice: Subject to any disclaimer, the term of this patent is extended or adjusted under 35 U.S.C. 154(b) by 275 days.

(21) Appl. No.: 16/630,471

(22) PCT Filed: Aug. 14, 2018

(86) PCT No.: PCT/EP2018/071986
§ 371 (c)(1),
(2) Date: Jan. 13, 2020

(87) PCT Pub. No.: WO2019/034636
PCT Pub. Date: Feb. 21, 2019

(65) Prior Publication Data
US 2021/0088083 A1 Mar. 25, 2021

(30) Foreign Application Priority Data
Aug. 15, 2017 (DE) ...................... 10 2017 118 605.0

(51) Int. Cl.
*F16D 3/223* (2011.01)
*F16D 3/2233* (2011.01)
(52) U.S. Cl.
CPC .. *F16D 3/2233* (2013.01); *F16D 2003/22303* (2013.01); *F16D 2003/22309* (2013.01); *Y10S 464/906* (2013.01)

(58) Field of Classification Search
CPC ......... F16D 3/2233; F16D 2003/22303; F16D 2003/22309; Y10S 464/906
(Continued)

(56) References Cited

U.S. PATENT DOCUMENTS 4,575,362 A 3/1986 Girguis
6,319,133 B1 11/2001 Schwärzler et al.
(Continued)

FOREIGN PATENT DOCUMENTS

DE 10 2004 018 777 A1 3/2005

OTHER PUBLICATIONS

Universal Joint and Driveshaft Design Manual, AE-7, Society of Automotive Engineers, Inc., Warrendale PA, Section 3.2.1. TJ1079. S62, pp. 99-101. (Year: 1979).*

*Primary Examiner* — Greg Binda
(74) *Attorney, Agent, or Firm* — Norman B. Thot

(57) ABSTRACT

A constant-velocity rotary joint includes an outer joint portion with outer ball tracks, an inner joint portion with inner ball tracks, balls guided in a track pair formed by one outer ball track and one inner ball track, and a cage with windows to accommodate and retain the balls. Each outer ball track has an outer ball track center line. Each inner ball track has an inner ball track center line. When the constant-velocity rotary joint is straight, the inner ball track center line and the outer ball track center line of the track pair intersect in an intersection point and are not mirror-symmetrical with respect to a mirror plane through the intersection point, and the inner portion of the inner ball track center line widens more, with respect to a longitudinal axis of the outer joint portion, than the outer portion of the outer ball track center line.

13 Claims, 8 Drawing Sheets

(58) Field of Classification Search
USPC .......................................................... 464/145
See application file for complete search history.

(56) References Cited

U.S. PATENT DOCUMENTS

| | | |
|---|---|---|
| 6,431,988 B1 | 8/2002 | Tone |
| 2004/0116192 A1 | 6/2004 | Krude et al. |
| 2009/0269129 A1 | 10/2009 | Harnischfeger |
| 2015/0072795 A1 | 3/2015 | Hildebrandt et al. |

* cited by examiner

CONSTANT-VELOCITY JOINT

CROSS REFERENCE TO PRIOR APPLICATIONS

This application is a U.S. National Phase application under 35 U.S.C. § 371 of International Application No. PCT/EP2018/071986, filed on Aug. 14, 2018 and which claims benefit to German Patent Application No. 10 2017 118 605.0, filed on Aug. 15, 2017. The International Application was published in German on Feb. 21, 2019 as WO 2019/034636 A1 under PCT Article 21(2).

FIELD

The present invention relates to a constant-velocity rotary joint for torque transmission.

BACKGROUND

A constant-velocity joint is a mechanical coupling connecting two shafts, wherein the rotation speed of an output shaft is equal to the rotation speed of an input shaft, irrespective of the bending angle of the joint. A constant-velocity rotary joint in this case comprises an outer joint portion with several outer ball tracks, an inner joint portion with several inner ball tracks, and torque-transmitting balls, which are each guided in track pairs of outer ball tracks and inner ball tracks. A cage is further provided which accommodates the balls in cage windows and retains them in a common joint center plane when the constant-velocity rotary joint is straight. When the joint is angled, the cage retains the balls in the homokinetic plane. In this case, a spherical outer surface of the cage rests, with clearance, against a spherical inner surface of the outer joint portion, while a spherical inner surface of the cage rests, with clearance, against a spherical outer surface of the inner joint portion, in order to thus enable the cage to pivot freely between the two joint portions.

When the joint is angled, the balls move inwards and outwards in the respective ball tracks while being retained in a common plane by the cage. In this case, a reliable and low-noise transmission of torque of the input shaft to the output shaft is to be provided even at large deflections. The courses of the ball tracks may be selected accordingly for this purpose, wherein it was found to be advantageous to form a ball track from several portions with different curvatures. In order to provide as large a deflection as possible, it is known, for example, that a concavely curved ball track of the outer joint portion widens towards the opening side of the joint. This widening may be configured to be linear, as is described, for example, in U.S. Pat. No. 6,431,988 B1. DE 197 06 864 C1 in contrast describes a constant-velocity rotary joint in which, in an outer ball track, a convex outer portion is adjacent to a concave inner portion.

Large bending angles of up to 53° or even 54° can be obtained thereby because the balls are able to partially protrude from the outer joint portion while being retained by the cage. However, constant-velocity joint with outer ball tracks widening towards the joint opening tend to be noisy. The addition of axial air clearances in the regions between the components outer joint portion, cage, and inner joint portion may cause increased clearance between the balls and ball tracks in the range of greater joint deflections.

SUMMARY

An aspect of the present invention is to provide a constant-velocity rotary joint which provides large bending angles in the range of 54° with as little noise development as possible.

In an embodiment, the present invention provides a constant-velocity rotary joint for torque transmission which includes an outer joint portion comprising a plurality of outer ball tracks, an inner joint portion comprising a plurality of inner ball tracks, balls configured to transmit torque, each of the ball being guided in a track pair formed by one of the plurality of outer ball tracks and one of the plurality of inner ball tracks, and a cage comprising cage windows which are configured to accommodate and to retain the balls in a common joint center plane when the constant-velocity rotary joint is straight. Each of the plurality of outer ball tracks comprise an outer ball track center line and a track base line which extends equidistantly to the outer ball track center line. Each of the plurality of inner ball tracks comprise an inner ball track center line and a track base line which extends equidistantly to the inner ball track center line. The outer joint portion further comprises a longitudinal axis, an opening, and a connecting part, the opening and the connecting part being arranged axially opposite to each other. Each outer ball track center line comprises at least one concavely curved inner portion and an outer portion arranged opposite thereto, the outer portion being configured to widen in a direction towards the opening of the outer joint portion and with respect to the longitudinal axis of the outer joint portion. Each inner ball track center line comprises at least one convexly curved outer portion and an inner portion arranged opposite thereto, the inner portion being configured to widen in a direction towards the connecting part of the outer joint portion and with respect to the longitudinal axis of the outer joint portion. When the constant-velocity rotary joint is maximally deflected, one of the balls contacts the outer portion of one of the plurality of outer ball tracks and the inner portion of one of the plurality of inner ball tracks. When the constant-velocity rotary joint is straight, the inner ball track center line and the outer ball track center line of the track pair intersect in an intersection point and are not mirror-symmetrical with respect to a mirror plane through the intersection point, the mirror plane being arranged in the joint center plane or parallel thereto, and the inner portion of the inner ball track center line widens more, with respect to the longitudinal axis of the outer joint portion, than the outer portion of the outer ball track center line.

BRIEF DESCRIPTION OF THE DRAWINGS

The present invention is described in greater detail below on the basis of embodiments and of the drawings in which.

DETAILED DESCRIPTION

Figure 1:
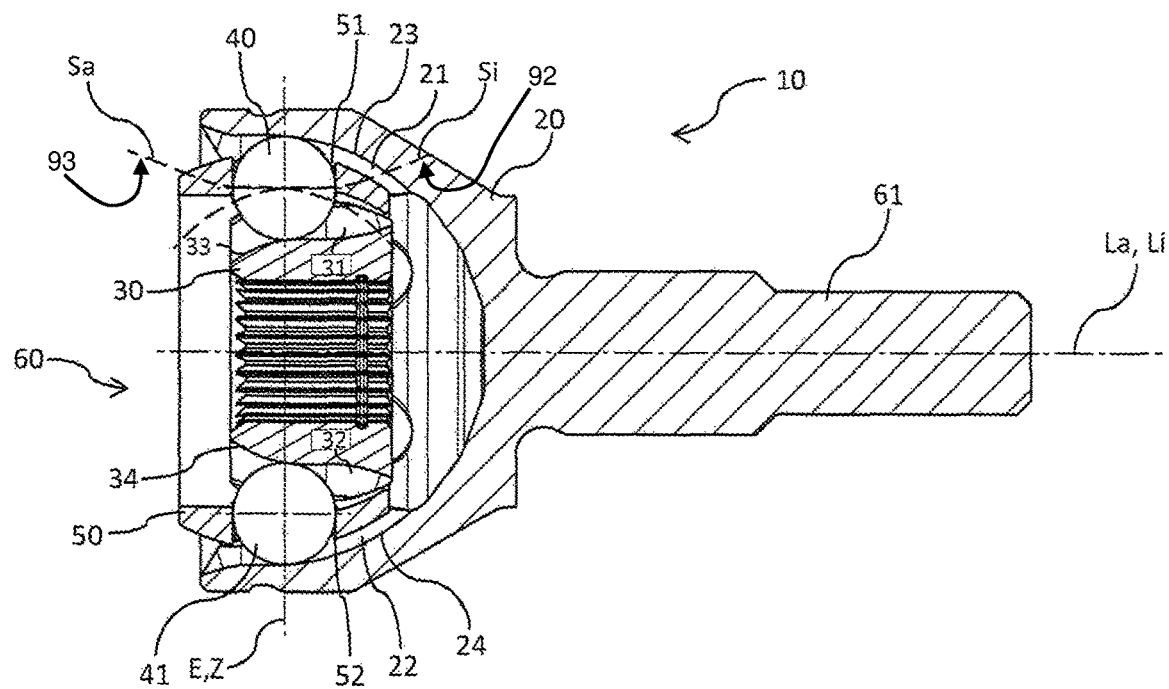
FIG. 1 shows a longitudinal section through an embodiment of a constant velocity ball joint according to the present invention while the joint is straight.

The constant-velocity rotary joint for torque transmission of the present invention comprises an outer joint portion with several outer ball tracks, an inner joint portion with several inner ball tracks, and torque-transmitting balls, which are each guided in track pairs of outer ball tracks and inner ball tracks. A cage is further provided which accommodates the balls in cage windows and retains them in a common joint center plane E when the constant-velocity rotary joint is straight. When the joint is angled, the cage retains the balls in the homokinetic plane. The outer joint portion has a longitudinal axis La and, situated axially opposite to each other, an opening and a connecting part. This can, for example, be a constant-velocity fixed ball joint. In the axial direction, the side of the opening of the joint is referred to as "outer", whereas the side of the connecting part is referred to as "inner".

The outer ball tracks of the outer joint portion have center lines Sa and track base lines extending equidistantly thereto, while the inner ball tracks have center lines Si and track base lines extending equidistantly thereto. In this case, the center lines Sa of the outer ball tracks have at least one concavely curved inner portion and, in each case opposite thereto, an outer portion widening in the direction towards the opening of the outer joint portion and with respect to the longitudinal axis La of the outer joint portion. The track curves of the outer ball tracks therefore widen towards the joint opening. Correspondingly, the center lines Si of the inner ball tracks have at least one convexly curved outer portion and, in each case opposite thereto, an inner portion widening in the direction towards the connecting part of the outer joint portion and with respect to the longitudinal axis La of the outer joint portion. The course of the center lines of the ball tracks, which is concave and convex in some sections, is in this case apparent in the radial viewing direction onto the respective ball track when the joint is straight.

Just like the outer ball tracks widen towards the joint opening, the inner ball tracks widen in the direction towards the connecting part. In the sense of the present invention, this means that, in the outer portions of the outer ball tracks, the distance between the respective center line or track base line and the longitudinal axis La of the outer joint part increases towards the joint opening. Correspondingly, in the inner portions of the inner ball tracks, the distance between the respective center line or track base line and the longitudinal axis Li of the inner joint part increases towards the connecting part. The balls are thus always retained between two ball tracks of a track pair when the joint is bent. The widening of the outer ball tracks can, however, start relatively far towards the outside, i.e., in the latter region of the joint bell.

When the constant-velocity rotary joint is maximally deflected, a ball contacts the outer portion of an outer ball track and the inner portion of an inner ball track of a ball track. Further track segments may be provided between the concave inner portion of an outer ball track and its outer portion, and between the convex outer portion of an inner ball track and its inner portion. These may be straight or curved portions. Further track segments, which are configured in a straight or curved manner, may also be adjacent to an outer portion and an inner portion. The center line of a ball track is composed of several curved or curved and straight segments. The radii of the curved portions and the slopes of the straight portions may in this case vary across the entire ball track. A ball track may thus have further inner or outer portions. For the present invention, however, the inner portion of an inner ball track and the outer portion of an outer ball track are defined so that they are those portions in whose area a ball contacts an outer ball track and an inner ball track of a track pair when the constant-velocity rotary joint is maximally deflected.

According to the present invention, the outer ball tracks do not, however, widen to the same extent as the inner ball tracks. The present invention rather provides that, when the constant-velocity rotary joint is straight, the center lines of an outer and an inner ball track of a track pair intersect in an intersection point S and, in this case, are not mirror-symmetrical with respect to a mirror plane Z through this intersection point S. In this case, the imagined mirror plane Z is located in the joint center plane E or parallel thereto. The track curve of the inner ball tracks is thus not a direct image of the track curve of the outer ball tracks, whereas that is the case in known constant-velocity joints with mirror-symmetrical track curves.

In this case, the difference between the courses of the center lines of the ball tracks of a track pair is that the inner portion of the center lines Si of the inner ball tracks widens more, with respect to the longitudinal axis La of the outer joint portion, than the outer portion of the center lines Sa of the outer ball tracks, or the outer portion of the center lines Sa of the outer ball tracks widens less than the inner portion of the center lines Si of the inner ball tracks. A reduction of the distance between the outer and inner ball track of a track pair can thus be obtained in the case of a joint that is deflected to a great, in particular maximum, extent, whereby the clearance of the balls decreases in this position. A negative noise development can thus be reduced and possible knocking noises, particularly when traveling along a curve, can be prevented. Large bending angles of up to 54° can at the same time be realized.

In this case, however, the courses of the inner and outer track curves may also differ in other partial areas. The different degrees of widening of the inner and outer ball tracks may be achieved in different ways. In contrast to previously known embodiments in which the outer portions of the outer ball tracks and the inner portions of the inner ball tracks widen to the same extent, it may be provided, for example, that the widening of the inner portions of the inner ball tracks is increased. The widening of the outer portions of the outer ball tracks may alternatively also be reduced.

In an embodiment of the present invention, it is provided, for example, that the outer portion of the center lines Sa of the outer ball tracks and the inner portion of the center lines Si of the inner ball tracks widen linearly with respect to the longitudinal axis La of the outer joint part. An angle Alpha a is thus spanned between the outer portion of an outer ball track and the longitudinal axis La of the outer joint portion. An angle Alpha i is spanned between the inner portion of an inner ball track and the longitudinal axis Li of the inner joint portion. In order for the straight outer portions of the outer ball tracks to widen to a greater extent than the straight inner portions of the inner ball tracks, it is provided that, with respect to the longitudinal axis La of the outer joint portion, the slope of the inner portion of the center lines Si of the inner ball tracks is greater than the slope of the outer portion of the center lines Sa of the outer ball tracks. In this case, the angle Alpha A is smaller than the angle Alpha i.

Apart from different slopes, different degrees of widening may also be obtained by an axial displacement of the beginning of an inner or outer portion. In an embodiment of the present invention, it is provided that, when a joint is straight and the center lines Si of the inner ball tracks are mirrored on the mirror plane Z, the entire mirrored inner portion of the mirrored center lines Si' of the inner ball tracks is closer to the connecting part than the entire outer portion of the center lines Sa of the outer ball tracks. The mirrored inner portion of the inner ball track is therefore displaced, relative to the outer portion of the outer ball track, parallel along the longitudinal axes La, Li, namely, in the direction of the connecting part of the joint. In that case, the widening of the linear inner portion of an inner ball track begins closer to the intersection point S than in the case of the outer portion of the outer ball track. In this case, it may be that only such a parallel displacement is present, or that additionally, the straight inner and outer portions differ from each other.

In an embodiment of the present invention, it is provided that the outer portion of the center lines Sa of the outer ball tracks widens in a curved manner with a radius Ra, and the inner portion of the center lines Si of the inner ball track widens in a curved manner with a radius Ri. In order for the curved outer portions of the outer ball tracks to widen to a greater extent than the curved inner portions of the inner ball tracks, it may be provided that, for example, the radius Ri of the inner portion of the center lines Si of the inner ball tracks is smaller than the Radius Ra of the outer portion of the center lines Sa of the outer ball tracks. The inner portion of an inner ball track is thereby curved to a greater extent than the outer portion of an outer ball track.

It may alternatively or additionally be provided, also for inner and outer portions, that different widenings are obtained by axially displacing the begin of an inner or outer portion in relation to the intersection point S. In an embodiment of the present invention, it is provided that, when a joint is straight and the center lines Si of the inner ball tracks are mirrored on the mirror plane Z, the entire mirrored inner portion of the mirrored center lines Si' of the inner ball tracks is closer to the connecting part than the entire outer portion of the center lines Sa of the outer ball tracks. In this case, when the center lines Si of the inner ball tracks are mirrored on the mirror plane Z, the center point of the circle associated with the radius Ri of the mirrored inner portion of the mirrored center lines Si' of the inner ball tracks is consequently closer to the connecting part than the center point of the circle associated with the radius Ra of the outer portion of the center lines Sa of the outer ball tracks, because the mirrored inner portion of the inner ball track as a whole is closer to the connecting part than the outer portion of the outer ball track. However, this is also the case if the curved inner portion of an inner ball track, when mirrored on the mirror plane Z, begins at the same point as the outer portion of an outer ball track, but the inner portion of the inner ball track is rotated towards the connecting part of the joint. A displacement of the inner portion of an inner ball track and such a rotation in the direction of the connecting part may also be provided.

In an embodiment of the present invention, the constant-velocity rotary joint can, for example, have a cage offset. In this case, the longitudinal axis La of the outer joint portion and the joint center plane E intersect in a joint center point O. The cage has a spherical outer cage surface and a spherical inner cage surface. The spherical outer cage surface is in surface contact with a spherical inner joint surface of the outer joint portion, while the spherical inner cage surface is in surface contact with a spherical outer joint surface of the inner joint portion. In order to cause the cage offset, the center points of the spherical inner cage surface and of the spherical outer cage surface are located on the longitudinal axis La on opposite sides of the joint center point O. The center points of the spherical inner cage surface and of the spherical outer cage surface are in particular in this case located at the same distance from the joint center point O.

In an embodiment of the present invention, the constant-velocity rotary joint can, for example, have a ball track offset. The ball track offset is provided if, when the joint is straight, the center points of the concave inner portions of the outer ball tracks and the center points of the convex outer portions of the inner ball tracks are located on the longitudinal axis La on opposite sides of the joint center point O. This ball track offset may also be combined with a cage offset. In this case, the center points of the concave inner portions of the outer ball tracks and the center points of the convex outer portions of the inner ball tracks can, for example, in each case be located at a greater distance from the joint center point O than the center points of the spherical inner cage surface and the spherical outer cage surface.

As a whole, a constant-velocity rotary joint may thus be provided with which large bending angles of 54° can be provided, with disadvantageous noise development being reduced. In this case, the joint construction space need not be changed in comparison with mirror-symmetrical courses of outer and inner ball tracks. Realistic intermediate-shaft diameters may also be used, and the outer diameter of the joint may be reduced further compared with known joints with large bending angles. The present invention can be used in constant-velocity joints with different numbers of balls.

Other advantages, special features and expedient further developments of the present invention are apparent from the claims and the following presentation of embodiments under reference to the drawings.

Figure 14:
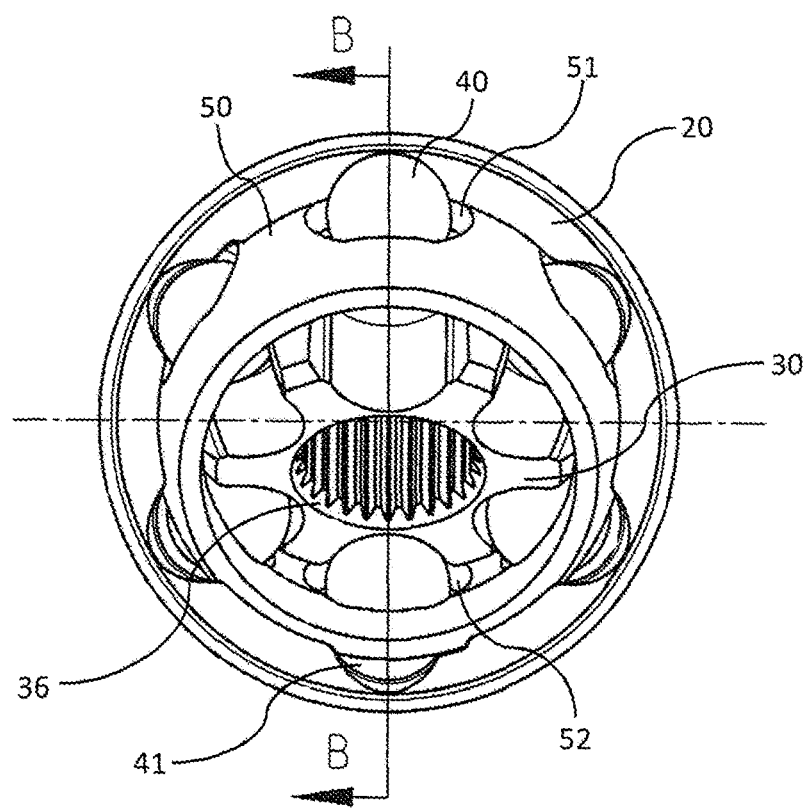
FIG. 14 shows a front view of a constant-velocity rotary joint according to FIG. 1 from the side of the opening, when the joint is maximally bent.

The constant-velocity rotary joint 10 shown in FIG. 1 is configured in a known manner and shown in the straight position, i.e., with a bending angle Omega of 0°. To make matters simple, the constant-velocity rotary joint 10 will simply be referred to below as a joint. The joint 10 has an outer joint portion 20 and an inner joint portion 30. A cage 50 with cage windows distributed over the circumference of the cage 50 is located between the outer joint portion 20 and the inner joint portion 30. One torque-transmitting ball is accommodated in each of these cage windows, wherein two opposite balls 40 and 41 in two cage windows 51 and 52 are shown in FIG. 1. In total, six balls are accommodated in the cage in this embodiment of a constant-velocity rotary joint 10, as is apparent from the illustrations of FIGS. 12 and 14. When the joint is straight, the center points of the balls are located in the joint center plane E, which extends at an angle of 90° to the longitudinal axis La of the outer joint portion 20 and the longitudinal axis Li of the inner joint portion 30.

The outer joint portion 20 is configured with a semi-spherical shape, like a joint bell, and is connected to a connecting part 61 via a bottom. This connecting part 61 is formed by a joint pin that can be connected to a shaft (not shown). An opening 60 of the outer joint portion 20, and thus of the entire joint 10, is located axially opposite to the connecting part 61. The inner joint portion 30 and the cage 50 with the balls 40, 41 are inserted into the outer joint portion 20 through this opening 60. The inner joint portion 30 is provided with an inner longitudinal toothing into which a shaft with an external toothing can be inserted in order thus to form a torque-transmitting shaft-hub connection (shown in FIG. 14).

Figure 12:
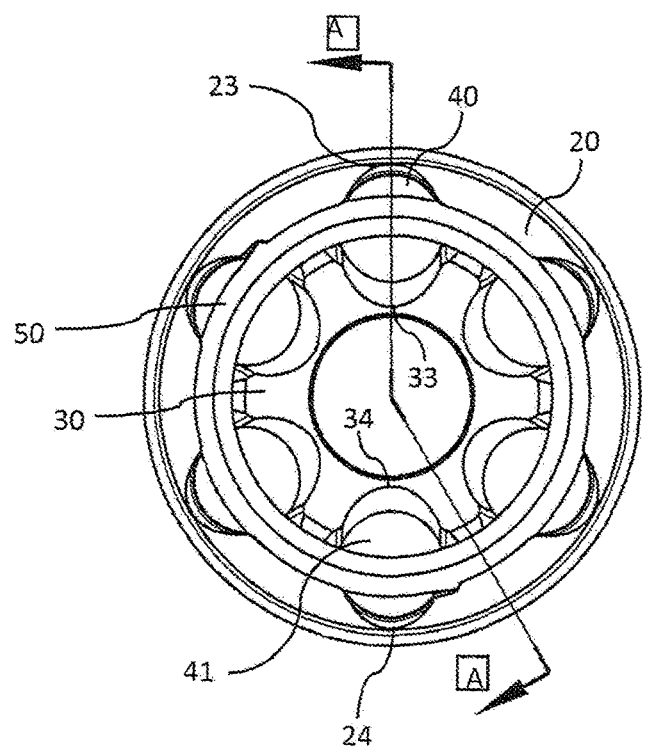
FIG. 12 shows a front view of a constant-velocity rotary joint according to FIG. 1 from the side of the opening, when the joint is straight.

On the outer joint portion 20, two of several circumferentially distributed outer ball tracks 21 and 22 are shown, while two of several circumferentially distributed inner ball tracks 31 and 32 are shown on the inner joint portion 30. The description of these ball tracks analogously applies also to the other ball tracks, which can, for example, be configured identically. The ball tracks 21 and 31 form a track pair for accommodating the ball 40, while the ball tracks 22 and 32 form another track pair for accommodating the ball 41. In a section along the joint center plane E, these ball tracks have a furrow-shaped cross section as it is also shown in FIG. 12. For example, the outer ball track 21 has a track base line 23, while the inner ball track 31 has a track base line 33. This also applies to the track base line 24 of the outer ball track 22 and the track base line 34 of the inner ball track 32.

For the outer ball track 21 and the inner ball track 31, the center lines of the respective ball track, which extend equidistantly to the associated track base lines 23 and 33, are shown in dashed lines in FIG. 1. In this case, the course of the ball tracks in the axial direction is composed of several portions having different radii and slopes. The outer ball track 21, and thus its center line Sa, has a concavely curved portion on the inner side, wherein the ball track 21 subsequently starts, in the area of the ball 40, to widen towards the opening 60. This widening portion is composed, for example, from several straight or curved segments.

The inner ball track 31, and thus its center line Si, also has a convexly curved portion on the outer side, wherein the ball track 31 starts, in the area of the ball 41, to widen towards the connecting part 61. This widening portion may also be composed from several straight or curved segments. The center line Si of the inner ball track 31 and the center line Sa of the outer ball track Sa intersect in a mirror plane Z, which in the embodiment of FIG. 1 coincides with the joint center plane E. Depending on the tolerance zone position of the joint, however, the mirror plane Z may also be located next to the joint center plane E.

Figure 2:
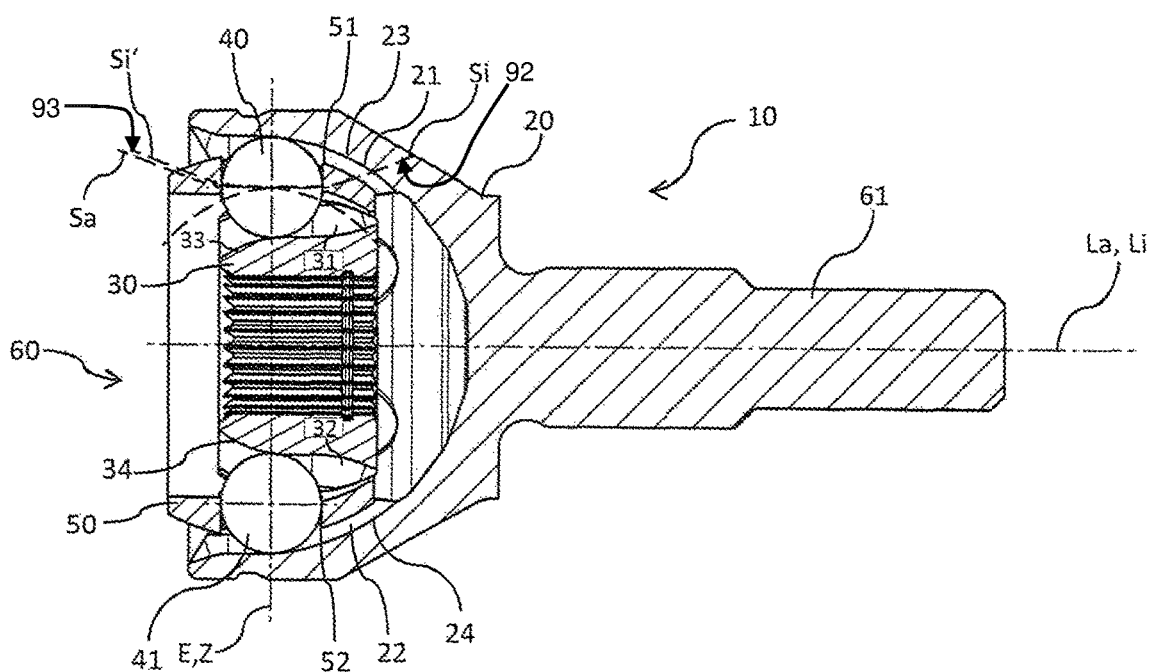
FIG. 2 shows a constant-velocity joint according to FIG. 1 with the mirrored course of the inner portion of an inner ball track.

According to the present invention, the two center lines Sa and Si are not mirror-symmetrical with respect to this mirror plane Z, i.e., the inner ball track 31 is not a direct image of the outer ball track 21. FIG. 2 shows the center line Si' of the inner ball track 31 mirrored on the mirror plane Z, and it is apparent that the course of the mirrored inner portion of the inner ball track 31 does not correspond to the course of the outer portion of the outer ball track 21. The mirrored inner portion of the inner ball track 31 widens to a greater extent than the outer portion of the outer ball track 21. Particularly in the case of the joint 10 being bent to a maximum bending angle, this has the positive effect, compared with conventional constant-velocity rotary joint, that the distance between the outer ball track 21 and the inner ball track 31 is reduced.

Figure 3:
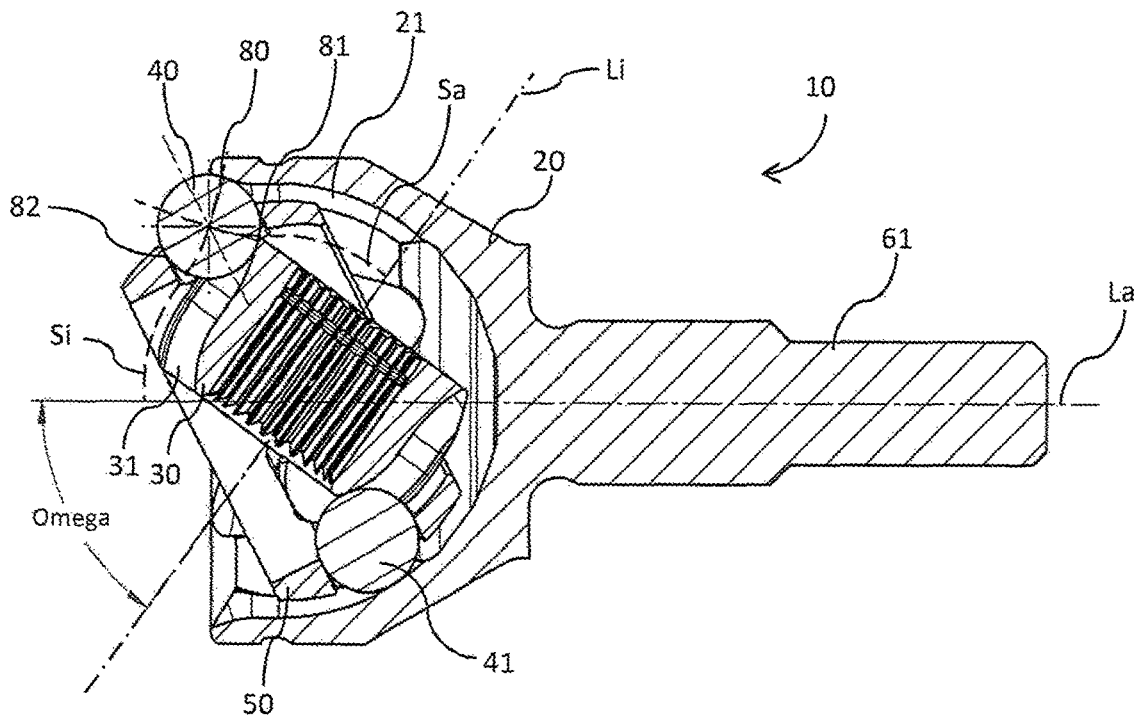
FIG. 3 shows a longitudinal section through a constant-velocity joint according to FIG. 1 with the joint being bent to the maximum extent.

FIG. 3 shows the joint 10 with a maximum deflection at a bending angle Omega. The angle Omega is in the area of 53°, or, for example, even 54°. This illustration is a section B-B through the joint of FIG. 14. In this position of the joint 10, the ball 40 partially protrudes from the joint bell of the outer joint portion 20 and is retained there by three points. A first contact region 80 is created between the ball 40 and the outer portion of the outer ball track 21. A second contact region 81 is created between the ball 40 and the inner portion of the inner ball track 31. A third contact region 82 is created between the ball 40 and the inner side of the cage window 51 of the cage 50. An axial clearance is present in each case between the outer joint portion 20, the inner joint portion 30 and the cage 50, which adds up in the case of a large deflection of the joint. In this case, the inner joint portion moves towards the opening 60 as the deflection of the joint increases. In conventional joints, the ball 40 may be retained with so much clearance between the three contact regions 80, 81 and 82 that disadvantageous noise development results. Due to the greater slope of the inner portion of the inner ball track 31, the ball 40 is moved towards the outer portion of the outer ball track 21 and the inner side of the cage window 51 in the case of large deflections, whereby the clearance and thus the noise development are reduced.

Figure 4:
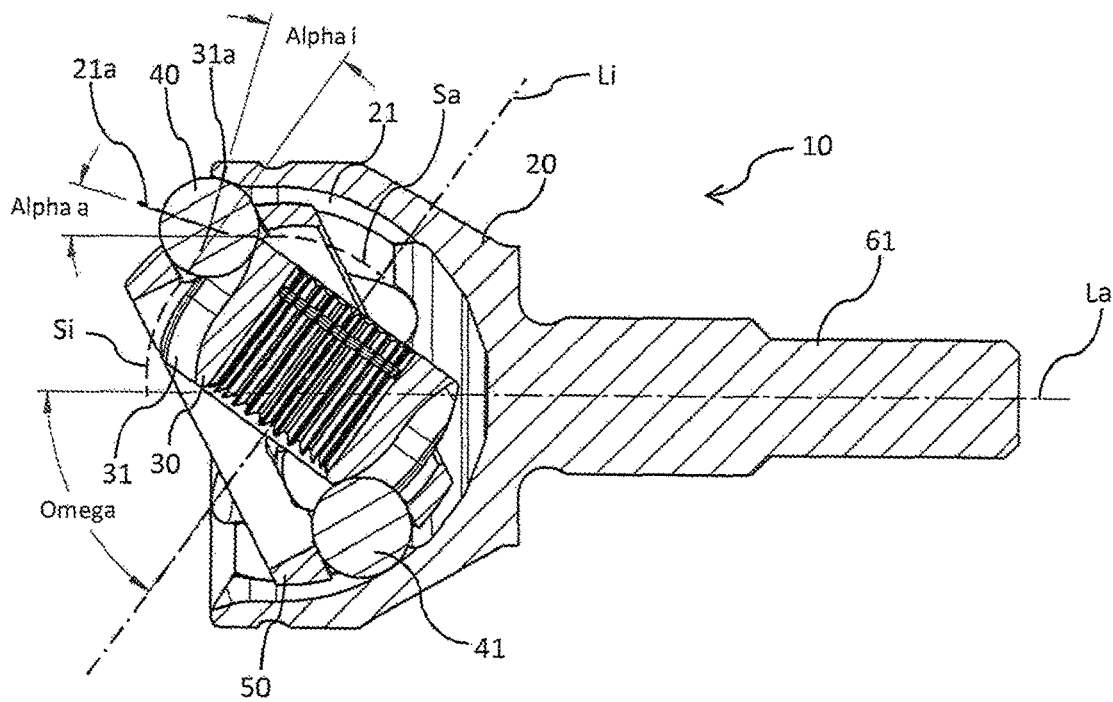
FIG. 4 shows a bent constant-velocity joint according to FIG. 3 with different angles of the center lines of the inner and outer ball tracks with respect to the longitudinal axes Li and La.

The different degrees of widening of the inner and outer ball tracks may be achieved in different ways. If the widening is linear, these linear widenings may be configured, for example, with different slopes relative to the respective longitudinal axes La, Li. FIG. 4 shows the joint 10 in the maximally bent position, wherein the inner portion 31i of the center line Si of the inner ball track 31 extends at an angle Alpha i to the longitudinal axis Li of the inner joint portion 30. The linear outer portion 21a of the center line Sa of the outer ball track 21 extends at an angle Alpha A to the longitudinal axis La of the outer joint portion 20. In this case, the angle Alpha a is greater than the angle Alpha i.

Figure 5:
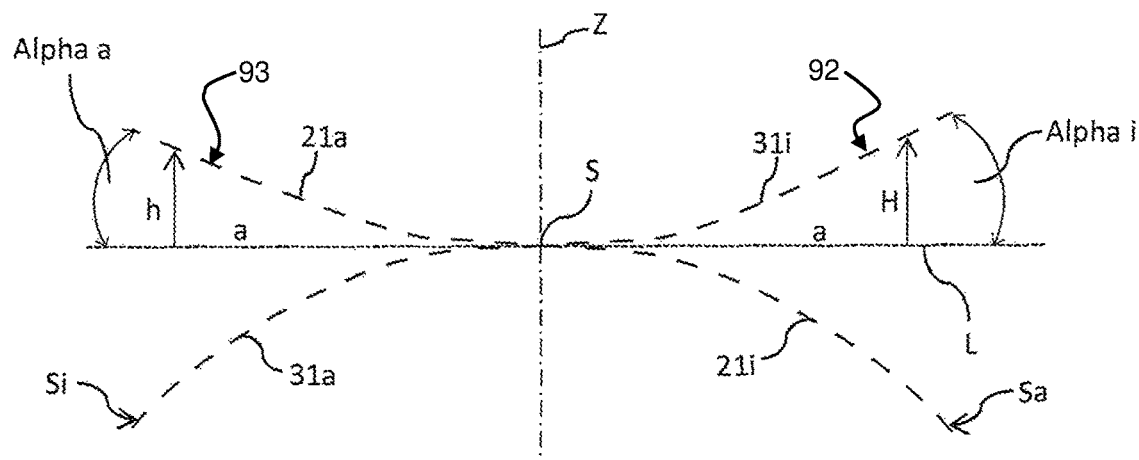
FIG. 5 shows a first embodiment of the course of the center lines of two ball tracks of a track pair with a linear widening.

For a simpler illustration of the greater widening of the inner portion 31i of the inner ball track 31, the course of the inner and outer ball tracks of a first embodiment of the constant-velocity rotary joint according to the invention is shown in FIG. 5. In the track pair shown, the center line Si of the inner ball track and the center line Sa of the outer ball track intersect in an intersection point S. At the same time, this intersection point S constitutes the intersection point of a mirror plane Z and an axis L, which extends at an angle of 90° to the mirror plane Z. The opening of the joint is here situated to the left in FIG. 5, whereas the connecting part is located to the right (see FIG. 1). The left-hand side is therefore referred to as "outer" in the drawings, whereas the right-hand side is referred to as "inner".

Both center lines Sa, Si are composed of several segments, which in total form a wavy track curve. The center line Si of the inner ball track has an outer portion 31a which, viewed in the viewing direction onto the inner ball track, is configured in a convex manner. A linear inner portion 31i, which extends at an angle Alpha i with respect to the axis L, is formed on the right-hand inner side. Correspondingly, the center line Sa of the outer ball track has an inner portion 21a which, viewed in the viewing direction onto the outer ball track, is configured in a concave manner. A linear outer portion 21a, which extends at an angle Alpha a with respect to the axis L, is formed on the left-hand outer side. As was already explained with regard to FIG. 4, Alpha a<Alpha i.

The two center lines Sa, Si are therefore not mirror-symmetrical with respect to the mirror plane Z. At a uniform distance a to the right and the left of the intersection point S, the spacing h, H between the axis L and the respective inner portion 31i and the outer portion 21a is therefore not equal. Rather, the spacing H between the axis L and the inner portion 31i of the inner ball track is greater than the spacing h between the axis L and the outer portion 21a a of the outer ball track. The distance a is defined by the fact that, when the joint is bent to a great and in particular maximum extent, the contact between a ball protruding from the outer joint part and the contact regions 80, 81 and 82 takes place in this region of the respective track curves (see FIG. 3).

Figure 6:
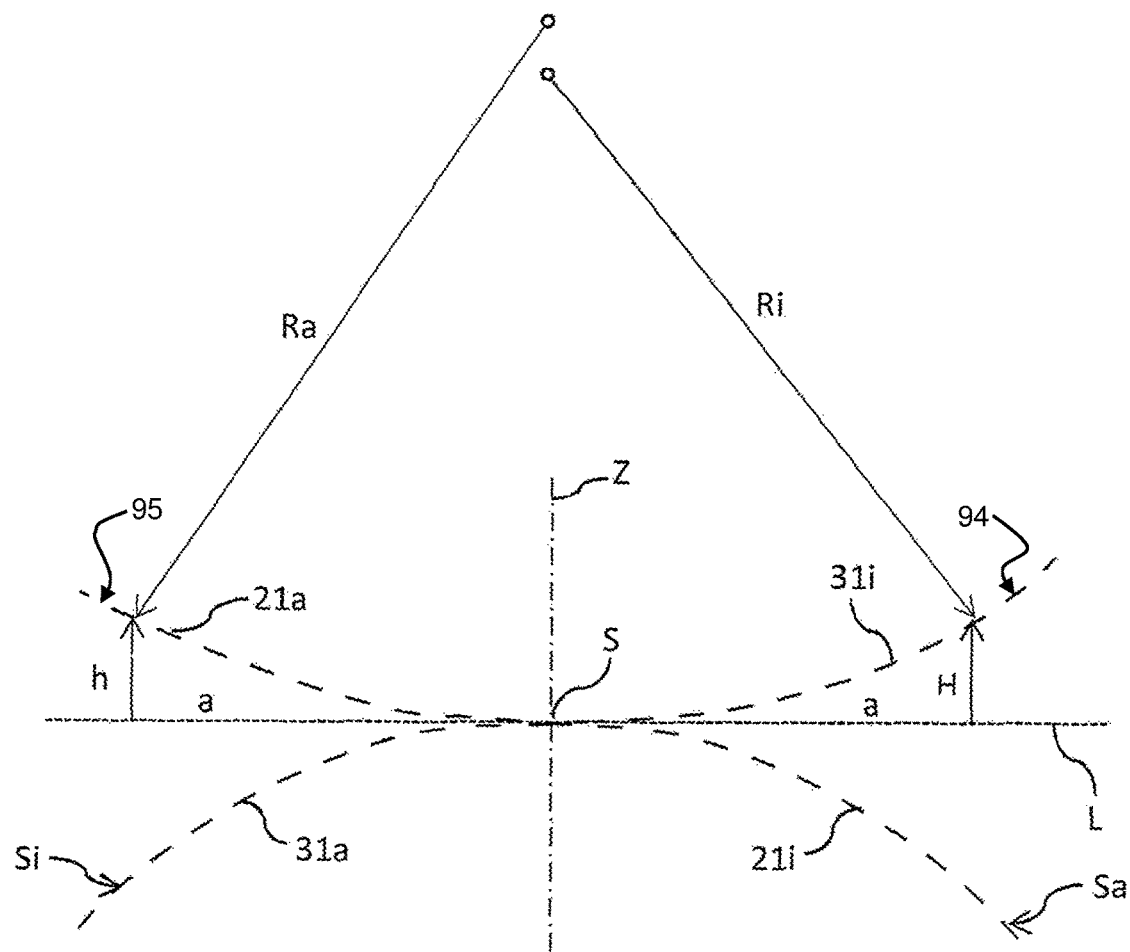
FIG. 6 shows a second embodiment of the course of the center lines of two ball tracks of a track pair with a curved widening.

FIG. 6 shows the course of the inner and outer ball tracks of a second embodiment of the constant-velocity rotary joint according to the present invention, wherein the same form of illustration was chosen as in FIG. 5. The center lines Sa, Si are again composed of several segments, which in total form an S-shaped track curve. The center line Si of the inner ball track again has an outer portion 31a which, viewed in the viewing direction onto the inner ball track, is configured in a convex manner. On the inner side, an inner portion 31i is formed, which is also curved but whose curvature is formed opposite to the curvature of the outer portion 31a. This curved inner portion 31i has a radius Ri.

Correspondingly, the center line Sa of the outer ball track has an inner portion 21i which, viewed in the viewing direction onto the outer ball track, is configured in a concave manner. On the outer side, a curved outer portion 21a is formed, whose curvature, however, is formed opposite to the curvature of the outer portion 21i. This curved outer portion 21a has a radius Ra. The two center lines Sa, Si are not mirror-symmetrical with respect to the mirror plane Z; rather, the radius Ri is smaller than the radius Ra. Thus, the distance h is smaller than the distance H.

In this case, the center lines Sa, Si may take various suitable courses in the region of the intersection point S, and also in the transition towards the inner portion 31i of the center line Si and the outer portion 21a of the center line Sa. This transition may, for example, be formed by several straight or curved track segments. Due to a special structural shape of the constant-velocity rotary joint, further segments, which in that case could not be associated with the course of the respective ball tracks if a ball does not pass through these areas during the operation of the joint, may be adjacent to the ends of the center lines Sa, Si, which are free in the FIGS. 5 and 6.

Figure 7:
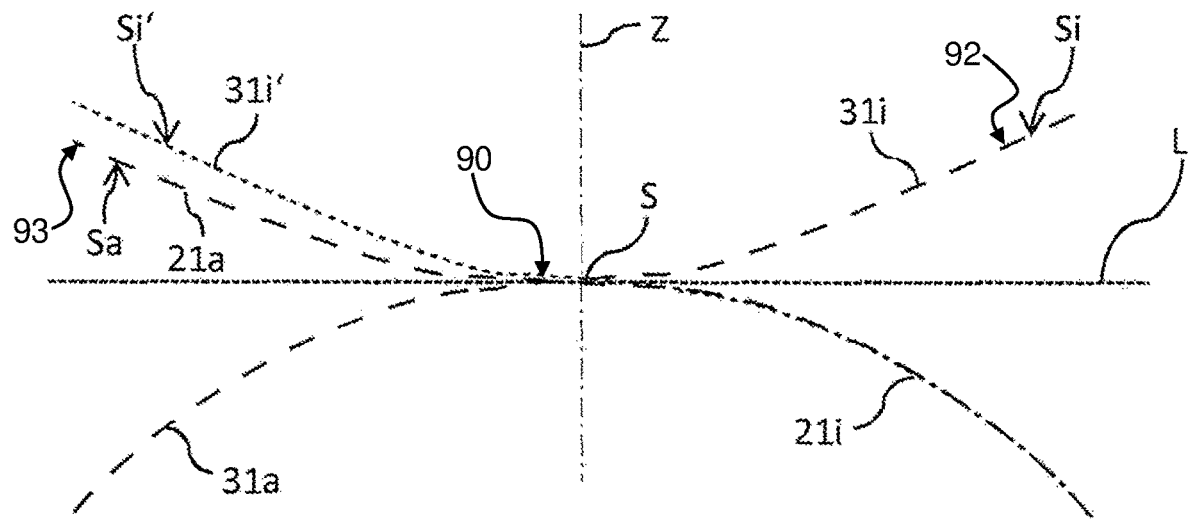
FIG. 7 shows a third embodiment of the course of the center lines of two ball tracks of a track pair with a linear widening.
Figure 8:
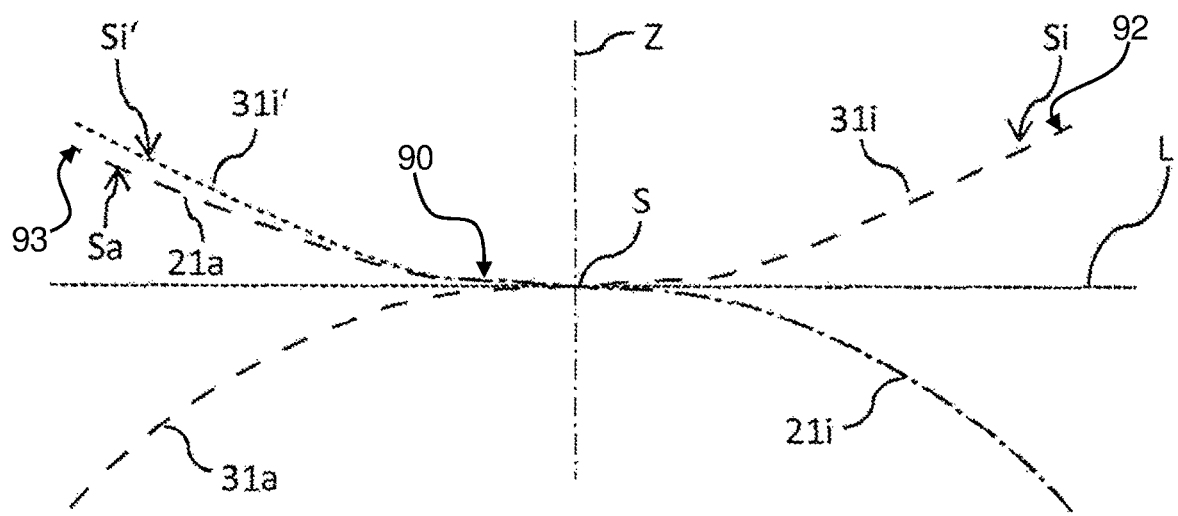
FIG. 8 shows a fourth embodiment of the course of the center lines of two ball tracks of a track pair with a linear widening.
Figure 9:
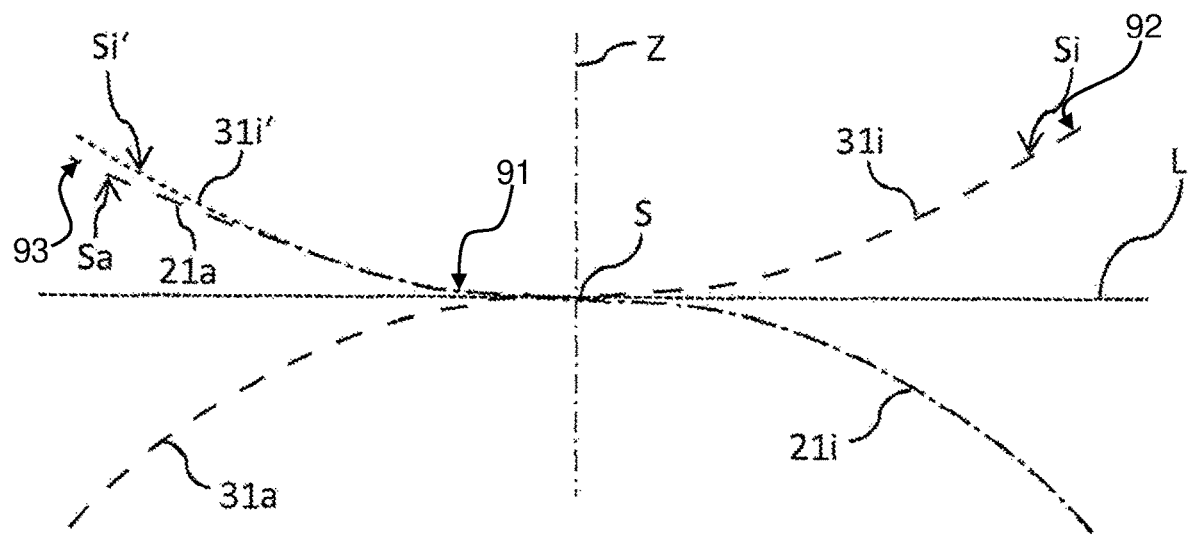
FIG. 9 shows a fifth embodiment of the course of the center lines of two ball tracks of a track pair with a linear widening.

Different spacings h, H at a distance a from the intersection point S may also be obtained with other variations of track curves. For example, FIGS. 7, 8 and 9 show variants of courses in the case of a linear widening of the ball tracks, with the center lines Sa and Si of the outer and inner ball tracks of a track pair each being illustrated with dashed lines. The mirror image of the center line Si of the inner ball track with respect to the mirror plane Z is in contrast illustrated with a dotted line and labeled with Si'. This results in a mirrored inner portion 31i' of the mirrored center line Si' of the inner ball track, based on which the course of this mirrored inner portion 31' can be compared with the outer portion 21a of the center line Sa of the outer ball track.

FIG. 7 shows a course of the inner ball track in which a parallel displacement of the straight outer portion 21a of the center line Sa of the outer ball track towards the right along the axis L yields the mirrored inner portion 31i' of the mirrored center line Si' of the inner ball track. In the case of such an imaginary mirroring, the mirrored inner portion 31i' is, as a whole, closer to the connecting part than the outer portion 21a. In contrast, FIG. 8 shows a course in which the center line Si' first follows the course of the center line Sa in the region of the intersection point S and the course of the outer portion 21a. The slope of the inner portion 31i' then increases relative to the outer portion 21a. In principle, FIG. 9 also shows such a track curve, whose mirrored center line Si', however, follows the course of the center line Sa even longer before its slope increases in the region of the mirrored inner portion 31i'.

Figure 10:
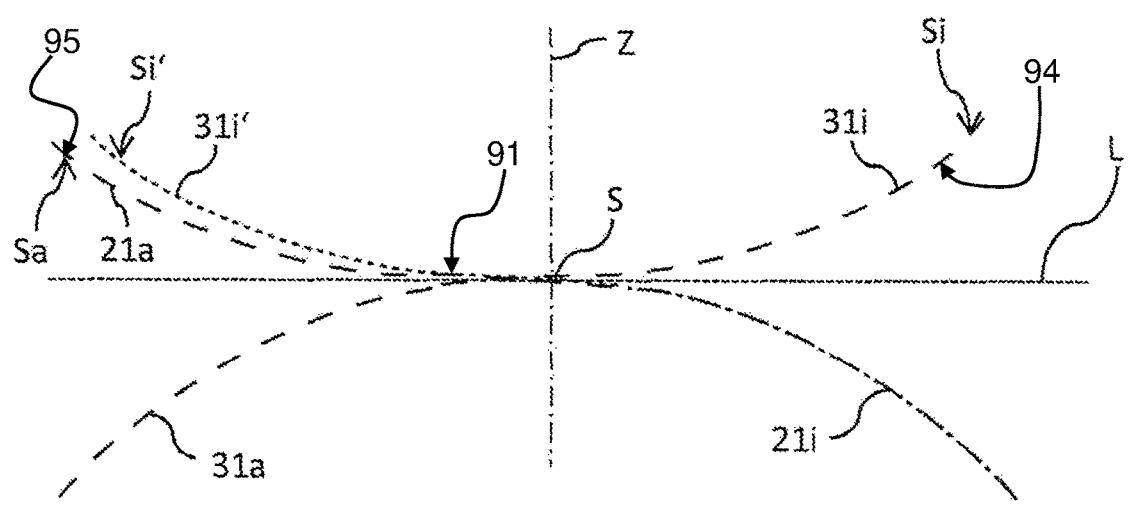
FIG. 10 shows a sixth embodiment of the course of the center lines of two ball tracks of a track pair with a curved widening.
Figure 11:
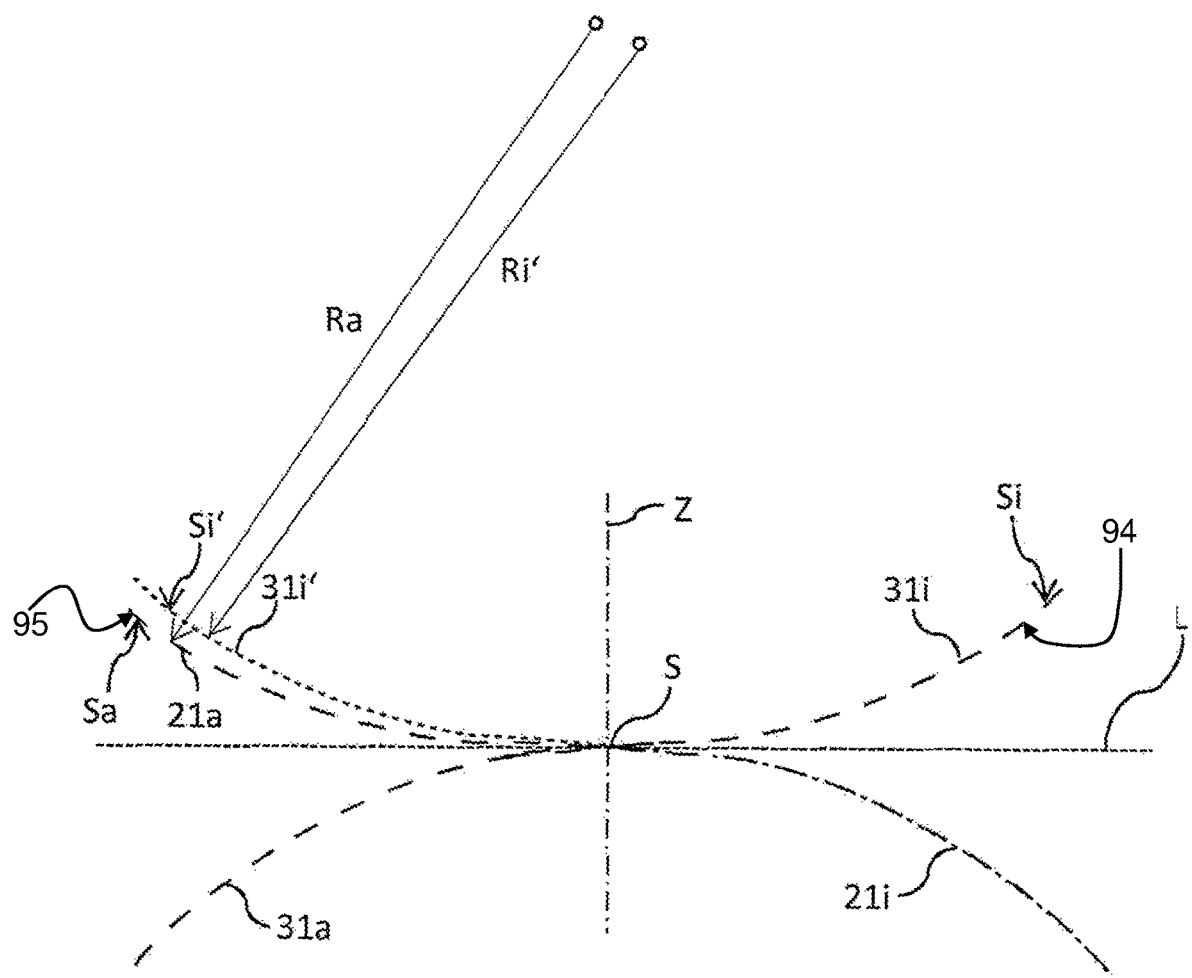
FIG. 11 shows a seventh embodiment of the course of the center lines of two ball tracks of a track pair with a curved widening.

FIGS. 10 and 11 show possible course variations for a curved widening of the ball tracks. FIG. 10 shows a course of the inner ball track in which a parallel displacement of the curved outer portion 21a of the center line Sa of the outer ball track towards the right along the axis L yields the mirrored inner portion 31i' of the mirrored center line Si' of the inner ball track. In the case of such an imaginary mirroring, the mirrored inner portion 31i' is, as a whole, closer to the connecting part than the outer portion 21a. In contrast, FIG. 11 shows a course in which the radius Ra of the curved outer portion 21a corresponds to the radius Ri' of the mirrored inner portion 31i'. However, the mirrored inner portion 31i' is rotated, as a whole, to the right about the intersection point S. In this case, the center point of the circle associated with the radius Ri of the mirrored inner portion 31i' of the mirrored center lines Si' is closer to the connecting part 61 than the center point of the circle associated with the radius Ra of the outer portion 21a of the center lines Sa of the outer ball tracks.

Individual ones of these embodiments of track curves may also be suitably combined with one another. For example, a mirrored inner portion 31i' may be rotated about the intersection point S and, at the same time, have a smaller radius than the outer portion 21a. Also, a curved inner portion 31i' may first follow the course of the outer portion 21a and then reduce its radius.

On the whole, the inner joint portion may exhibit a greater widening of the opening track region than the outer joint portion. The effect may also be obtained by the outwardly opening widening of the inner joint portion beginning earlier. The effect may moreover be obtained by a first preceding curvature of the outwardly opening track region of the inner joint portion beginning over a longer extent.

Figure 13:
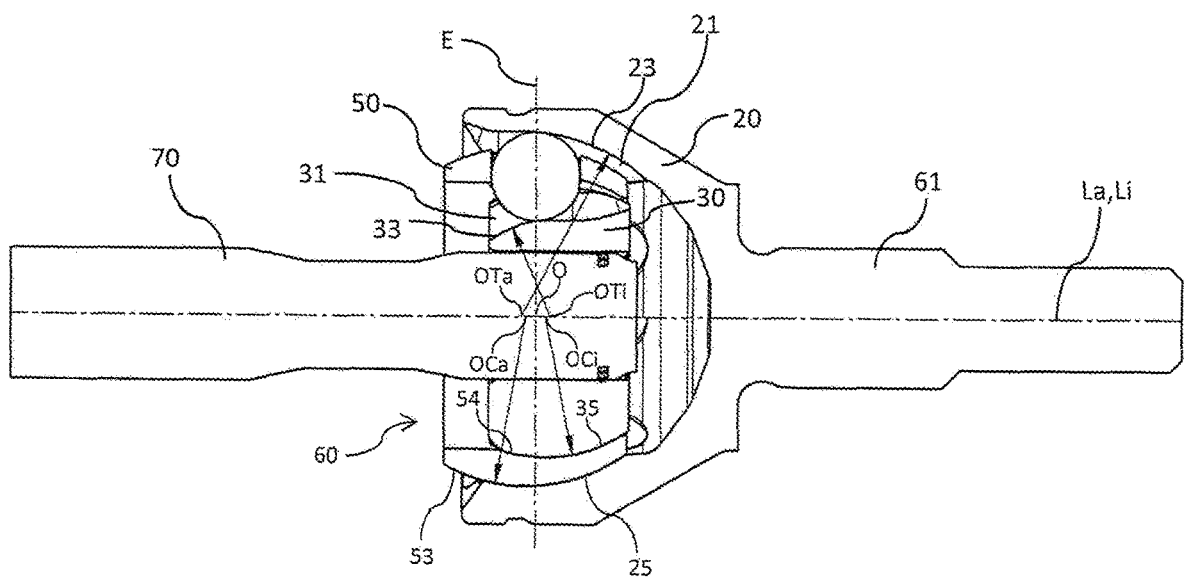
FIG. 13 shows a section A-A through the constant-velocity rotary joint of FIG. 12.

In addition to non-mirror-symmetrically extending track curves, the constant-velocity rotary joint according to the present invention may also have different offsets. In particular, a cage offset can, for example, be combined with a ball track offset. FIG. 13 shows a section A-A through the joint of FIG. 12, in which a shaft 70 is inserted into the inner longitudinal toothing of the inner joint portion 30 and the joint is in the straightened position. In that case, the longitudinal axis La of the outer joint portion 20 coincides with the longitudinal axis Li of the inner joint portion 30. The joint center line E intersects the longitudinal axes La, Li in the joint center point O.

The center point of the curved track base line 23 of the outer ball track 21 is located on the longitudinal axes La, Li to the left of the joint center point O, that is, with respect to this joint center point O, on the side of the opening 60 of the joint. This intersection point with the longitudinal axes La, Li is labeled OTa in FIG. 13. The center point of the curved track base line 33 of the inner ball track 31 is located on the longitudinal axes La, Li to the right of the joint center point O, that is, with respect to this joint center point O, on the side of the connecting part 61 of the joint. This intersection point with the longitudinal axes La, Li is labeled OTi.

The cage 50 has a spherical outer cage surface 53 which abuts against a spherical inner joint surface 25 of the outer joint portion 20. The cage 50 also has a spherical inner cage surface 54, which abuts against a spherical outer joint surface 35 of the inner joint portion 30. The center point of the curved outer cage surface 53 is located on the longitudinal axes La, Li to the left of the joint center point O, that is, with respect to this joint center point O, on the side of the opening 60 of the joint. This intersection point with the longitudinal axes La, Li is labeled OCa. The center point of the curved inner cage surface 54 is located on the longitudinal axes La, Li to the right of the joint center point O, that is, with respect to this joint center point O, on the side of the connecting part 61 of the joint. This intersection point with the longitudinal axes La, Li is labeled OCi in FIG. 13.

In this case, the intersection points OTa and OTi can, for example, be located at the same distance from the joint center point O. This also applies to the intersection points OCa, and OCi. The intersection points OCa and OCi are, however, closer to the joint center point O than the intersection points OTa and OTi, i.e., the ball track offset is greater than the cage offset.

The present invention is not limited to embodiments described herein; reference should be had to the appended claims. The features cited individually in the claims can thereby be combined with each other in any technologically meaningful manner and represent other embodiments of the present invention. The description, in particular in connection with the drawings, additionally characterizes and specifies the present invention.

LIST OF REFERENCE NUMERALS

10 Constant-velocity rotary joint, joint
20 Outer joint portion
21, 22 Outer ball track
21$i$ Inner portion of an outer ball track
21$a$ Outer portion of an outer ball track
23, 24 Track base line of an outer ball track
25 Inner joint surface
30 Inner joint portion
31, 32 Inner ball track
31$i$ Inner portion of an inner ball track
31$i'$ Mirrored inner portion of an inner ball track
31$a$ Outer portion of an inner ball track
33, 34 Track base line of an inner ball track
35 Outer joint surface
36 Longitudinal toothing
40, 41 Ball
50 Cage
51, 52 Cage window
53 Outer cage surface
54 Inner cage surface
60 Opening
61 Connecting part
70 Shaft
80, 81, 82 Contact region
90 Further portion, linear
91 Further portion, curved
92 Linear widening
93 Linear widening
94 Curved Widening
95 Curved widening
H, h Spacing
L Axis
La Longitudinal axis of outer joint portion
Li Longitudinal axis of inner joint portion
E Joint center plane
S Intersection point
Z Mirror plane
O Joint center point
OCi Intersection point inner side of cage
OCa Intersection point outer side of cage
OTi Intersection point of inner ball track
OTa Intersection point of outer ball track
Omega Bending angle
Si Center line of inner ball track
Si' Mirrored center line of inner ball track
Sa Center line of outer ball track
Ri Radius of inner portion of inner ball track
Ri' Radius of mirrored inner portion of inner ball track
Ra Radius of outer portion of outer ball track

What is claimed is:

1. A constant-velocity rotary joint for torque transmission comprising:
an outer joint portion comprising a plurality of outer ball tracks;
an inner joint portion comprising a plurality of inner ball tracks;
balls configured to transmit torque, each of the ball being guided in a track pair formed by one of the plurality of outer ball tracks and one of the plurality of inner ball tracks; and
a cage comprising cage windows which are configured to accommodate and to retain the balls in a common joint center plane when the constant-velocity rotary joint is straight,
wherein,
each of the plurality of outer ball tracks comprise an outer ball track center line and a track base line which extends equidistantly to the outer ball track center line,
each of the plurality of inner ball tracks comprise an inner ball track center line and a track base line which extends equidistantly to the inner ball track center line,
the outer joint portion further comprises a longitudinal axis, an opening, and a connecting part, the opening and the connecting part being arranged axially opposite to each other,
each outer ball track center line comprises at least one concavely curved inner portion and an outer portion arranged opposite thereto, the outer portion being configured to widen in a direction towards the opening of the outer joint portion and with respect to the longitudinal axis of the outer joint portion,
each inner ball track center line comprises at least one convexly curved outer portion and an inner portion arranged opposite thereto, the inner portion being configured to widen in a direction towards the connecting part of the outer joint portion and with respect to the longitudinal axis of the outer joint portion,
when the constant-velocity rotary joint is maximally deflected, one of the balls contacts the outer portion of one of the plurality of outer ball tracks and the inner portion of one of the plurality of inner ball tracks, and
when the constant-velocity rotary joint is straight,
the inner ball track center line and the outer ball track center line of the track pair intersect in an intersection point and are not mirror-symmetrical with respect to a mirror plane through the intersection point, the mirror plane being arranged in the joint center plane or parallel thereto, and the inner portion of the inner ball track center line widens more, with respect to the longitudinal axis of the outer joint portion, than the outer portion of the outer ball track center line.

2. The constant-velocity rotary joint as recited in claim 1, wherein, each outer ball track center line further comprises further portions adjacent to at least one of the at least one concavely curved inner portion and the outer portion, and each inner ball track center line further comprises portions adjacent to at least one of the at least one convexly curved inner portion and the outer portion.

3. The constant-velocity rotary joint as recited in claim 2, wherein the further portions are formed in a linear manner or in a curved manner.

4. The constant-velocity rotary joint as recited in claim 1, wherein, the outer portion of each outer ball track center line widens linearly with respect to the longitudinal axis of the outer joint part, and the inner portion of each inner ball track center line widens linearly with respect to the longitudinal axis of the outer joint part.

5. The constant-velocity rotary joint as recited in claim 4, wherein, with respect to the longitudinal axis of the outer joint portion, a slope of the inner portion of each inner ball track center line is greater than a slope of the outer portion of each outer ball track center line.

6. The constant-velocity rotary joint as recited in claim 4, wherein, when each inner ball track center line is mirrored on the mirror plane, an entire mirrored inner portion of each inner ball track center line mirrored is closer to the connecting part than an entire outer portion of each outer ball track center line.

7. The constant-velocity rotary joint as recited in claim 1, wherein, the outer portion of each outer ball track center line widens in a curved manner with a first radius, and the inner portion of each inner ball track center line widens in a curved manner with a second radius.

8. The constant-velocity rotary joint as recited in claim 7, wherein the second radius is smaller than the first radius.

9. The constant-velocity rotary joint as recited in claim 7, wherein, when each inner ball track center line is mirrored on the mirror plane, a center point of a circle associated with the second radius is closer to a connecting part than a center point of a circle associated with the first radius.

10. The constant-velocity rotary joint as recited in claim 1, wherein, the longitudinal axis of the outer joint portion and the joint center plane intersect in a joint center point, the cage further comprises a spherical outer cage surface and a spherical inner cage surface, the outer joint portion further comprises a spherical inner joint surface and a spherical outer joint surface, the spherical outer cage surface is in a surface contact with the spherical inner joint surface of the outer joint portion, the spherical inner cage surface is in a surface contact with the spherical outer joint surface of the inner joint portion, and center points of the spherical inner cage surface and of the spherical outer cage surface are located on the longitudinal axis on opposite sides of the joint center point.

11. The constant-velocity rotary joint as recited in claim 10, wherein the center points of the spherical inner cage surface and of the spherical outer cage surface are located at a same distance from the joint center point.

12. The constant-velocity rotary joint as recited in claim 10, wherein, the longitudinal axis of the outer joint portion and the joint center plane intersect in the joint center point, and center points of the at least one concavely curved inner portion of the plurality of outer ball tracks and center points of the at least one convexly curved outer portion of the plurality of inner ball tracks are located on the longitudinal axis on opposite sides of the joint center point.

13. The constant-velocity rotary joint as recited in claim 12, wherein the center points of the at least one concavely curved inner portion of the plurality of outer ball tracks and the center points of the at least one convexly curved outer portions of the plurality of inner ball tracks are each located at a greater distance from the joint center point than the center points of the spherical inner cage surface and of the spherical outer cage surface.

* * * * *